Oct. 7, 1969 J. N. CASTELLI 3,471,715
A.C. BRIDGE GATE CIRCUIT BEING CONTROLLED BY A DIFFERENTIAL AMPLIFIER
Filed Sept. 21, 1966
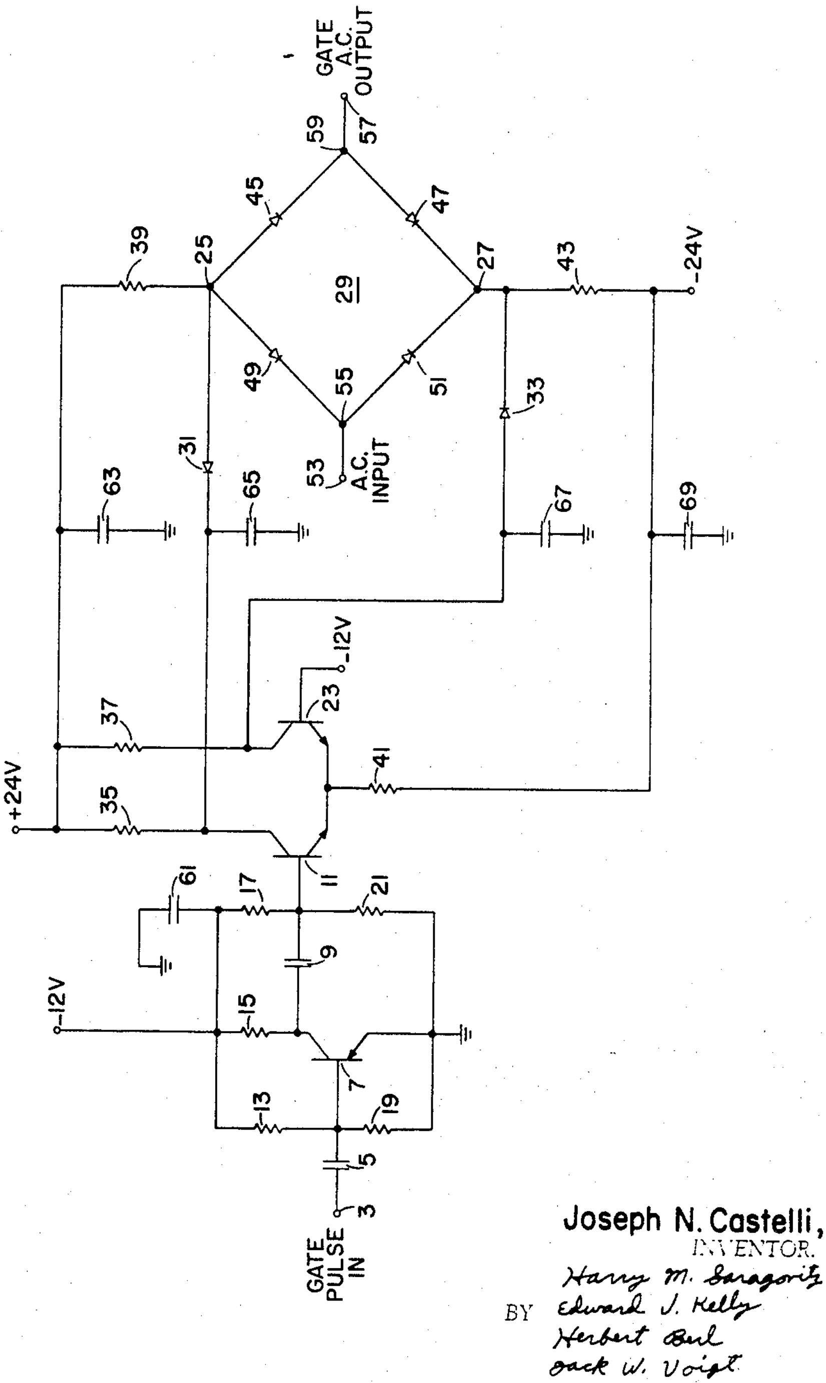
Joseph N. Castelli,
INVENTOR.
BY Harry M. Saragovitz
Edward J. Kelly
Herbert Berl
Jack W. Voigt

United States Patent Office 3,471,715

Patented Oct. 7, 1969

3,471,715

A.C. BRIDGE GATE CIRCUIT BEING CONTROLLED BY A DIFFERENTIAL AMPLIFIER

Joseph N. Castelli, Hull, Mass., assignor, by mesne assignments, to the United States of America as represented by the Secretary of the Army

Filed Sept. 21, 1966, Ser. No. 581,421

Int. Cl. H03k *17/56*

U.S. Cl. 307—257 3 Claims

ABSTRACT OF THE DISCLOSURE

A device including a switching network and a bridge. When a positive input pulse is applied to the base of a transistor, a bias is applied to the bridge. With the control bias applied, the bridge passes A.C. In the absence of an input pulse, no control bias is applied to the bridge, and A.C. is blocked.

The present invention relates to a gating device and more particularly to an A.C. gating device which, when connected in series with a signal line, will enable A.C. signals to pass for the duration of a control pulse and will block all A.C. signals in the absence of the control pulse.

At present, there is an ever increasing need for a dependable and compact A.C. gating device especially in communications networks and modern radars where I.F. signals are gated for the purpose of time sharing, etc.

It is, therefore, an object of this invention to provide an A.C. gate circuit for gating an A.C. signal responsive to a gate pulse input.

Further, it is an object of this invention to provide a much more dependable gating circuit.

Another object is to provide a less expensive gating circuit which is cheaper and easier to maintain.

Still another object of this invention is to provide a solid state A.C. gating circuit which can be incorporated in a module package.

Other objects and many of the attendant advantages of this invention will be readily appreciated as the same becomes better understood by reference to the following detailed description when considered in connection with the accompanying drawing therein:

The single figure is a schematic diagram of an A.C. gate circuit according to the present invention.

Referring now to the drawing, wherein for the purpose of illustration only, there is shown an input terminal 3 which is connected to a coupling capacitor 5, this in turn connecting with the base electrode of a transistor 7. From the collector electrode of transistor 7 the circuit is extended through a coupling capacitor 9 to the base electrode of transistor 11. Biasing of transistor 7 and the base of transistor 11 is provided by a —12 v. voltage supply. The —12 v. voltage supply is connected to the base and collector electrodes of transistor 7 through resistors 13 and 15 respectively and to the base of transistor 11 through resistor 17. The emitter of transistor 7 is connected to ground potential and to its base electrode by means of resistor 19, and the base of transistor 11 is connected to ground potential through a resistor 21.

Proceeding now to the circuitry associated with transistor 11 which is connected in a common emitter configuration with transistor 23, it will be observed that the collector electrodes of transistors 11 and 23 are connected to separate inputs (25 and 27) of a diode bridge circuit 29 through diodes 31 and 33 respectively. The collectors of transistors 11 and 23 are also connected to a +24 v. voltage supply through resistors 35 and 37 respectively, and the +24 v. voltage supply is further connected to terminal 25 of bridge circuit 29 through a resistor 39.

The voltage supply to transistors 11 and 23 is completed by a resistor 41 connected between the common emitter connection of transistors 11 and 23 and a —24 v. voltage supply. A —12 v. voltage supply is connected to the base of transistor 23 for providing proper bias. Terminal 27 of bridge circuit 29 is connected to the —24 v. voltage supply through a resistor 43.

Bridge circuit 29 is made up of two legs with one leg having a pair of series connected diodes 45 and 47 and the other leg having a pair of series connected diodes 49 and 51, and all of the diodes being connected for conduction in the same direction. An A.C. input terminal 53 is provided for connection to a terminal 55 of bridge 29 and a gated A.C. output terminal 57 is connected to a terminal 59 of bridge circuit 29.

A plurality of filter capacitors 61, 63, 65, 67, and 69 are provided for shorting any A.C. signal to ground which could disrupt or trigger the circuit.

IN OPERATION

During the absence of a gate pulse to terminal 3, transistor 7 is saturated (0 volts at its collector). The bias on transistor 11 is set up by the resistors 17 and 21 and is such that transistor 11 is saturated, causing a negative potential at its collector electrode. The emitter follower action of transistor 11 causes its base voltage level to exist at its emitter. Since this voltage is more positive than that of the base of transistor 23, transistor 23 is turned off. Current through resistor 37, diode 33 and resistor 43 causes a positive voltage to exist at the collector of transistor 23 while current through resistor 39, diode 31, transistor 11, and resistor 41 causes a negative voltage to appear at the collector of transistor 11.

Since both diodes 31 and 33 are conducting, the negative voltage at the collector of transistor 11 and the positive voltage at the collector of transistor 23 appears across the diode bridge 29 at terminals 25 and 27 in a polarity which back biases bridge diodes 45, 47, 49, and 51. Therefore, any signal appearing at A.C. input terminal 53 cannot pass through the back biased diodes to the gated A.C. output terminal 57.

A positive going gate pulse appearing at terminal 3 which is coupled to the base of transistor 7 by capacitor 5 will turn transistor 7 off, causing its collector to become negative. This negative signal is capacity coupled by capacitor 9 to the base of transistor 11, turning it off. With no collector current, the collector of transistor 11 will rise to the positive supply voltage.

At the same time, transistor 23 will turn on since its emitter is more negative than its base. The collector of transistor 23 will drop from a positive voltage to a negative voltage level. Diode bridge 29 is now in the forward biased direction. The diode bridge drive current will flow through resistor 39, as well as resistor 43, causing shorting of the diode bridge. Diodes 31 and 33 will become back biased, isolating the bridge from its transistor drive circuitry.

Therefore, it can be seen that any signal appearing at the A.C. input terminal 53 will also appear at the gated A.C. output terminal 57 for the duration of the gate pulse. At the end of the gate pulse, the diode bridge 29 returns to its back biased state thus giving the complete gate action.

Obviously, many modifications and variations of the present invention are possible in the light of the above teachings. It is, therefore, to be understood that within the scope of the appended claims, the invention may be practiced otherwise than as specifically described.

What is claimed is:

1. An A.C. gate circuit for gating an A.C. signal source to an output terminal of the circuit responsive to a gate pulse input comprising: a diode bridge circuit having first, second and third input terminals and an output terminal, said first input terminal being connected to said A.C. signal source, said output terminal of said bridge circuit being connected to said output terminal of said gate circuit; and switching means connected between said second and third input terminals of said bridge circuit for selectively biasing said bridge circuit forward and reverse, said switching means being responsive to said gate pulse input whereby when a gate pulse is applied to said switching means said bridge circuit is forward biased thus allowing said A.C. signal to pass through said bridge circuit to said output terminal for a period of time corresponding to the duration of said gate pulse, said switching means including a first transistor having base, emitter and collector electrodes, said base electrode of said first transistor being capacitively coupled to said gate pulse input, said emitter electrode being connected to ground potential, a second transistor having base, emitter and collector electrodes, a third transistor having base, emitter and collector electrodes, said base electrode of said third transistor being connected to a negative voltage source, said second and third transistors having their emitter electrodes connected in common, said base electrode of said second transistor being capacitively connected to said collector electrode of said first transistor, circuit means connecting said collector electrodes of said second and third transistors to said second and third inputs of said bridge circuit respectively whereby said bridge circuit is forward biased or reverse biased responsive to said gate pulse.

2. An A.C. gate as set forth in claim 1 wherein said circuit means includes a first diode connected between said collector electrode of said second transistor and said second input of said bridge circuit, a second diode connected between said collector electrode of said third transistor and said third input of said bridge circuit, a positive voltage source, a first resistor connected between said positive voltage source and said collector electrode of said second transistor a second resistor connected between said positive voltage source and said collector electrode of said third transistor, a third resistor connected between said positive voltage source and said second input of said bridge circuit, a negative voltage source, a fourth resistor connected between said negative voltage source and said commonly connected emitters of said second and third transistors, and a fifth resistor connected between said negative voltage source and said third input of said bridge circuit.

3. An A.C. gate circuit as set forth in claim 2 wherein said diode bridge circuit includes a pair of parallel legs each having a pair of series connected diodes connected for conduction in the same direction, and said legs being connected between said first and third inputs of said bridge circuit.

References Cited

UNITED STATES PATENTS

| | | | |
|---|---|---|---|
| 2,990,477 | 6/1961 | MacIntyre | 307—257 |
| 3,179,817 | 4/1965 | Bounsall | 307—257 X |
| 3,223,851 | 12/1965 | Kitchens et al. | 330—69 X |
| 3,284,641 | 11/1966 | St. John | 307—257 X |

JOHN S. HEYMAN, Primary Examiner
J. D. FREW, Assistant Examiner

U.S. Cl. X.R.

307—255; 330—30